United States Patent [19]  
Boisseau

[11] 3,855,487  
[45] Dec. 17, 1974

[54] VIBRATION GENERATOR FOR STUDYING STRUCTURES

[75] Inventor: Jean-Francois Boisseau, Paris, France

[73] Assignee: Office National D'Etudes Et De Recherches Aerospatiales (par abreviation D.N.E.R.A.), Chatillon-sous-Bagneux, France

[22] Filed: Feb. 12, 1973

[21] Appl. No.: 331,487

[52] U.S. Cl............................ 310/80, 74/25, 310/83
[51] Int. Cl. ............................................. H02k 7/06
[58] Field of Search .............. 74/25, 92, 89.15, 127; 198/220 DA; 310/80, 81, 83

[56] References Cited
UNITED STATES PATENTS

| 916,318 | 3/1909 | Humphry | 198/111 X |
| 1,266,475 | 5/1918 | Hunt | 198/111 |
| 3,173,040 | 3/1965 | Cruzan | 310/83 |
| 3,583,248 | 6/1971 | Langenberg | 74/89.15 |
| 3,640,138 | 2/1972 | Hahn et al. | 74/89.15 |
| 3,733,914 | 5/1973 | Sheesley | 74/89.15 |

*Primary Examiner*—William H. Beha, Jr.  
*Attorney, Agent, or Firm*—Charles E. Temko

[57] ABSTRACT

The invention relates to a vibration generator for studying the behaviour of structures, particularly aircraft wings, its application being especially advantageous when said structure is subjected at the same time to the action of a generator and the effect of outside stresses of a variable, undetermined or irregular nature.

The vibration generator is so designed that the transmission of the effects of outside stresses to the inert mass is attenuated with respect to the transmission of the generating forces set up by the motor means of the generator.

The generator motor means comprise a unit alternately rotating in both directions, rotation movement being converted into rectilinear movement by means of a mechanical torque device.

19 Claims, 11 Drawing Figures

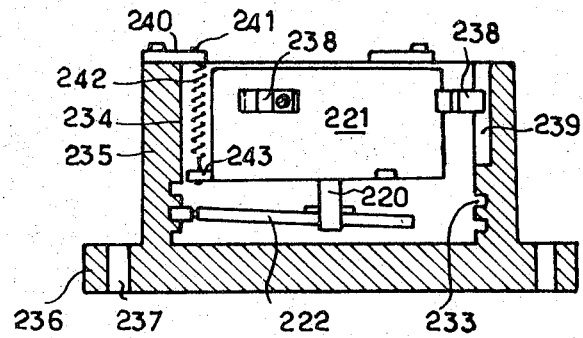
FIG.9
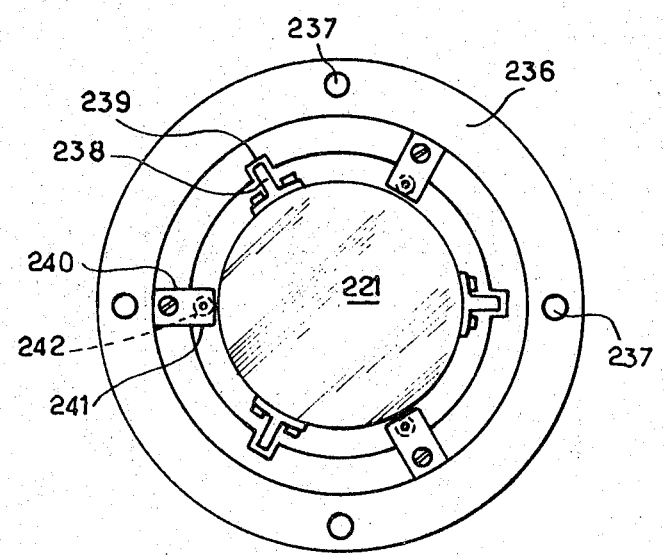
FIG.10
FIG.11
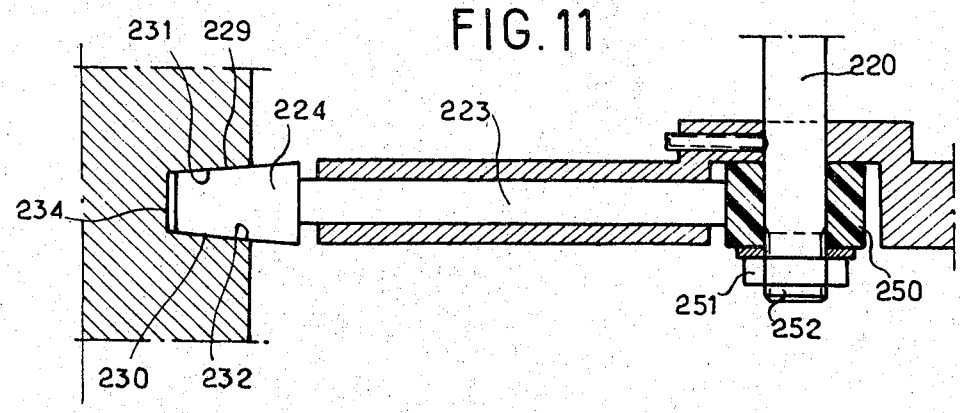

VIBRATION GENERATOR FOR STUDYING STRUCTURES

The present invention relates to a vibration generator for studying structural behaviour which is of particularly advantageous use when the structure being studied is subjected at the same time to the action of the generator and to the effect of outside stresses, especially variable, indeterminate outside stresses, which may be of an irregular nature. This is the case in an aircraft wing surrounded by a flow of air in relative movement and subjected to vibrations.

The present invention relates to vibration generators using the reciprocating motion of an inertial mass having a translational movement in both directions. With known generators of this type, the movements of the intertial mass depend not only on the driving means provided therefor, but also on the effect of outside stresses exerted on the structure, and it has been found that, under certain conditions, these movements are so excessively amplified that they may destroy or damage the means provided to limit them.

The object of the invention is a vibration generator so designed that the transmission of the effects of outside stresses to the inertial mass is attenuated with respect to the transmission of the generating forces set up by the driving means of the generator.

In most of the known generators using the linear translation movement in both directions of an inertial mass, the movement is induced by electromagnetic attraction effects alternately generated in opposite directions. It has also been proposed to use a motor rotating continuously in the same direction and connected to the mass by a rod-crank system.

The vibration generator according to the invention is, on the contrary, characterized in that the driving means comprise a unit alternately rotating in either direction, the rotational movement being converted into rectilinear movement by means of a mechanical linkage.

It has been found that the effect of outside stresses applied to the vibrated structure might then be sufficiently attenuated for the reciprocating movements of said mass in either directions according to a rectilinear movement to substantially remain those generated by the driving means or, at least, to not diverge from the expected movements up to the extent where they would disturb the experiment.

It is to be believed that this relative insensitiveness with respect to the effect of outside stresses results from the rotational inertia created by the rotating unit, which here has a role somewhat similar to that in an Atwood machine, well known for the study of the effect of gravity.

The vibration generator according to the invention thus makes it possible to study the behaviour of structures subjected to outside stresses which may be high in intensity, undetermined and irregular, without said outside stresses impairing the equipment and the measurements. It thus makes it possible to carry out hitherto impossible studies, particularly of aircraft wings, to which it is, in addition, well suited owing to its small overall dimensions.

The invention further relates to an embodiment characterized in that the driving means of the generator is constituted by an electric motor adapted to rotate in either of two directions and is particularly concerned with the use as a driving means of an electric motor known as a servomotor, which is a direct current motor with a light-weight rotor, said motor being supplied by a current flowing in one direction or the other, the rotor being correspondingly driven to rotate in one direction or the other.

The supply current may be sinusoidal, otherwise variable and even randomly variable.

The rotor movement of the motor may be converted by means of any rotational/translational means and the invention concerns in this respect the use of the especially simple means constituted by a pinion and a rack or a linear gearing.

The invention also includes within its frame the means comprising a helicoidal wheel and a tangent screw, a screw and a nut, this means being reversible or irreversible.

In the following description given for the purposes of example, reference is made to the attached drawings wherein:

FIG. 9 is a vertical cross-sectional view of a fourth embodiment;

FIG. 10 is a corresponding top view; and

FIG. 11 is a larger scale partial cross-section.

Figure 1:
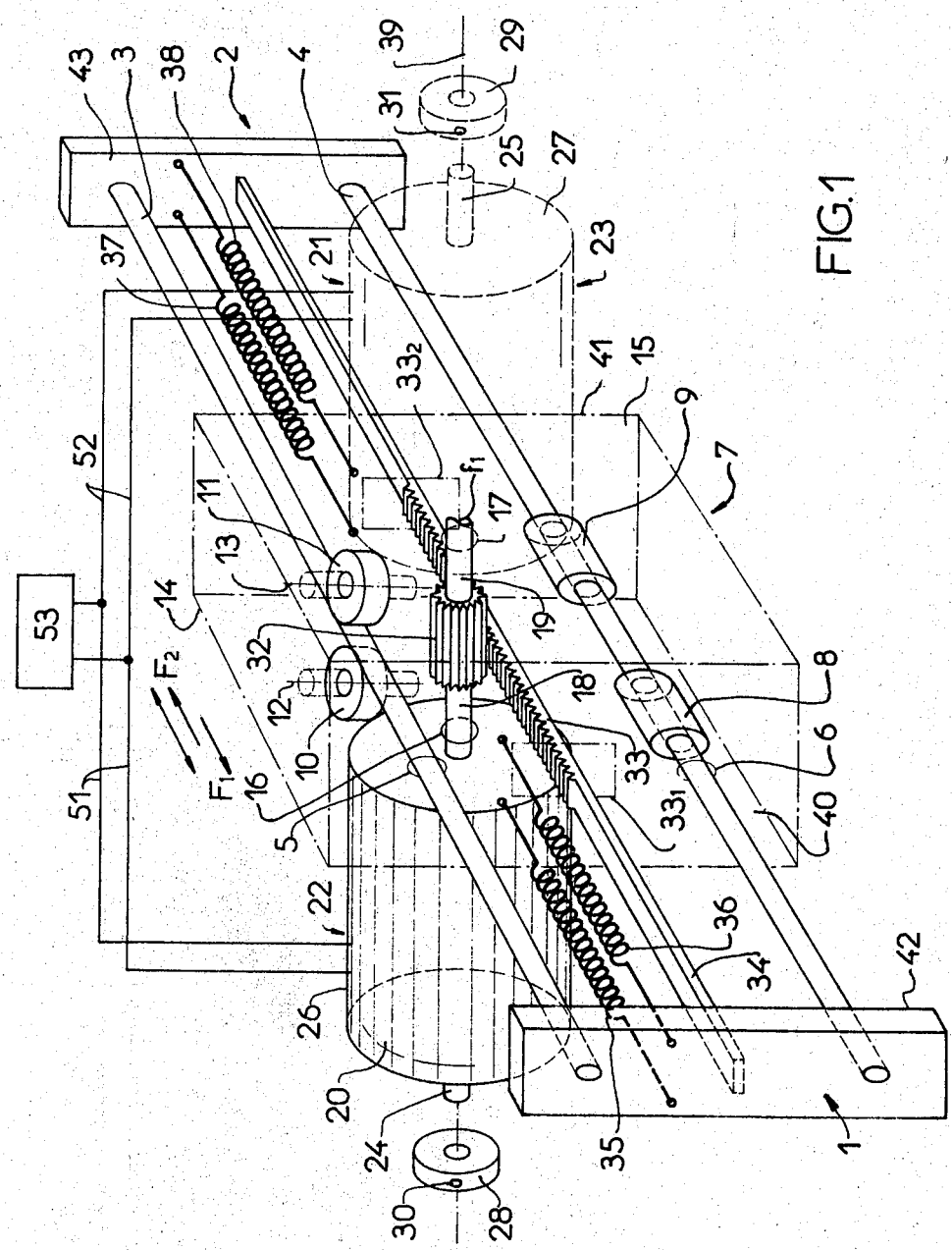
FIG. 1 is a perspective view of a vibration generator according to the invention.

In the first embodiment shown in FIG. 1, the vibration generator comprises two parallel uprights 1 and 2, one of which, at least, comprising means for attachment to the structure to be vibrated. The uprights are connected by two parallel guide rods 3 and 4 to which a carriage 7 is fitted by means of through-holes 5 and 6, the translation movement of said carriage in either directions with respect to the double arrow being guided, on the one hand, by axial ball type guides 8 and 9 the axes of which are aligned with that of rod 4, and, on the other hand, by ball bearings 10 and 11 cooperating with rod 3, the axis 12 and 13 of which are at right angle to the axis of rod 3.

The large surfaces 14 and 15 of the carriage 7, which is of a generally parallelpiped form, comprises through-holes 16 and 17 for the shaft portions 18 and 19 belonging to a shaft common to rotors 20 and 21 of two electric motors 22 and 23 of the type used as servomotors, the ends 24 and 25 of which project beyond the frames 26 and 27 of said motors. Said projections may be used, as shown at 28 and 29, for fitting removable washers 28 and 29 by means of tightening screws inserted into tapped holes 30 and 31.

A cylindrically toothed gear 32 supported by shaft portions 18 and 19 and integral therewith, engages the teeth of a rack 33 provided on a bar 34 interposed between uprights 1 and 2 and integral therewith, the bar being parallel to rods 3 and 4 and passing through holes $33_1$ and $33_2$ located on surfaces 40 and 41 of carriage 7.

Springs, four of them in the example, 35–38, are located in the plane containing the axis 39 of the common shaft of motors 22 and 23 between the small vertical surfaces (in the FIG. 1) 40 and 41 of carriage 7 and the inner surfaces 42 and 43 of uprights 1 and 2.

The mechanical characteristics of the springs are so selected, for each structure studies, that the natural frequency of the moving parts constituting a mass, rotational inertial, return tension system, is located outside the frequency range expected in the experiment.

Safety thrusts switches, not represented in the FIG., are placed on the inner surfaces of uprights 1 and 2 in order to switch off the power supply of the motor when the displacements of a carriage 7 exceed a predetermined stroke.

These thrusts may be associated within of stroke devices (not shown) adapted to absorb any impact of carriage 7;

Motors 22 and 23 are supplied by circuits 51 and 52 respectively connected to a current generator 53 in such a way that rotors 20 and 21 rotate first in one direction and then in the other, and again in the first direction, etc..

When the rotors rotate, for example in the direction of arrow $f_1$, the mobile unit constituted by the carriage 7 and and the two motors 22 and 23 moves in the direction of arrow $F_1$, the gear 32 engaging with the gearing of rack 33. The mobile unit thus approaches upright 1. When the rotor direction of rotation is reversed, the unit constituted by the carriage 7 and motors 22 and 23 moves in the opposite direction, indicated by arrow $F_2$, and approaches upright 2. It is this alternating movement of the inertial mass constituted by carriage 7 and motors 22 and 23 which sets up vibrations in the structure to which the generator is attached by one of uprights 1 and 2 or by both.

It has been found that the effects of the outside stresses applied to the structure are transmitted in a reduced manner to the inertial mass and, in particular, that attenuation is sufficient for the amplitude of the movement of said mass not to exceed a predetermined value.

It has also been found that the degree of attenuation may be regulated by the positioning of washers 28 and 29 having suitable weight, which confirms that this attenuation results from the rotational inertia created by the rotating unit constituted by the rotors 20 and 21 of the motors, gear 32 and, possibly, washers 28 and 29.

The degree of attenuation also depends on the diameter of the gear forming part of the rotation/translation means constituted by the gear and the rack.

By selecting the diameter of gear 10, and possibly the masses of the inertial washers, it is possible to ensure at the same time that the structure is vibrated, as required for experimented purposes, and to sufficiently attenuate the effect of outside stresses to prevent the translation movements of the inertial mass from reaching excessive amplitude.

Such a generator may be positioned so that the reciprocating movement is horizontal, as represented in the Figure. It may also be so positioned that the translation movement of the inertial mass is vertical. A spring may then be provided to compensate for the weight of said mass.

Figure 2:
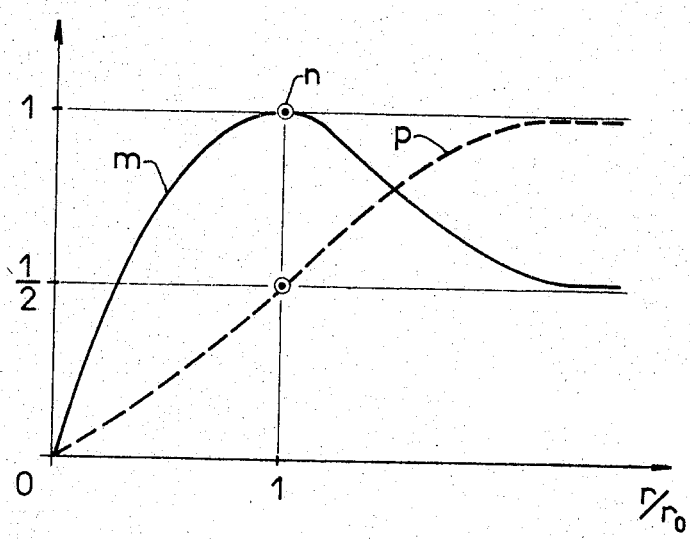
FIG. 2 is a graph.

The abscissa of the graph in FIG. 2 represents a dimensional parameter which is, for example, the ratio of radius $r$ of the gear to a radius $r_0$ taken as a reference and which is a function of the total mass driven in a translation movement and of the rotational moment of inertia of the rotating elements; the ordinate shows the value of stress transmitted to this structure.

Curve $m$ represents the stress transmitted to the inertial mass from the generator for a given constant motor torque. This curve represents a maximum at point $n$ which corresponds to value 1 of the ratio $r/r_0$, i.e., for a gear with a radius of precisely $r_0$.

The same graph features a curve $p$ characterizing the fraction of outside stresses transmitted to the inertial mass.

The graphs shows that for the values $r_0$ of the gear radius, only half the outside stresses are transmitted to the inertial mass, which clearly shows the attenuation obtained with respect to the outside stresses by means of the generator according to the invention and its vibrating efficiency.

For the purposes of example, the main characteristics of an actual vibration generator are now given:
two coupled motors driving a gear with a pitch diameter of 11.2 mm;
moment of inertia in rotation: $8.5 \times 10^{-6} m^2 Kg$;
moving mass 2.7 Kg;
supply: 18 V with a current of 10 A (effective);
motor torque: 0.25 meter-Newton;
frequency range used: 0.1 to 30 Hertz;
stress exerted on the structure: 40 Newtons;
attenuation of outside stresses exerted on the structure: 10 percent.

In order to obtain greater attenuation, a washer is fitted to each of the motor shaft ends as indicated above.

With an additional mass of 238 g, the additional moment of inertia is $47.6 \times 10^{-7} m^2 Kg$.

With the same supply, the motor torque remains the same and a stress on the structure of 27 Newtons is obtained and an attenuation of outside stresses on the structure equal to 40 percent is obtained.

Figure 3:
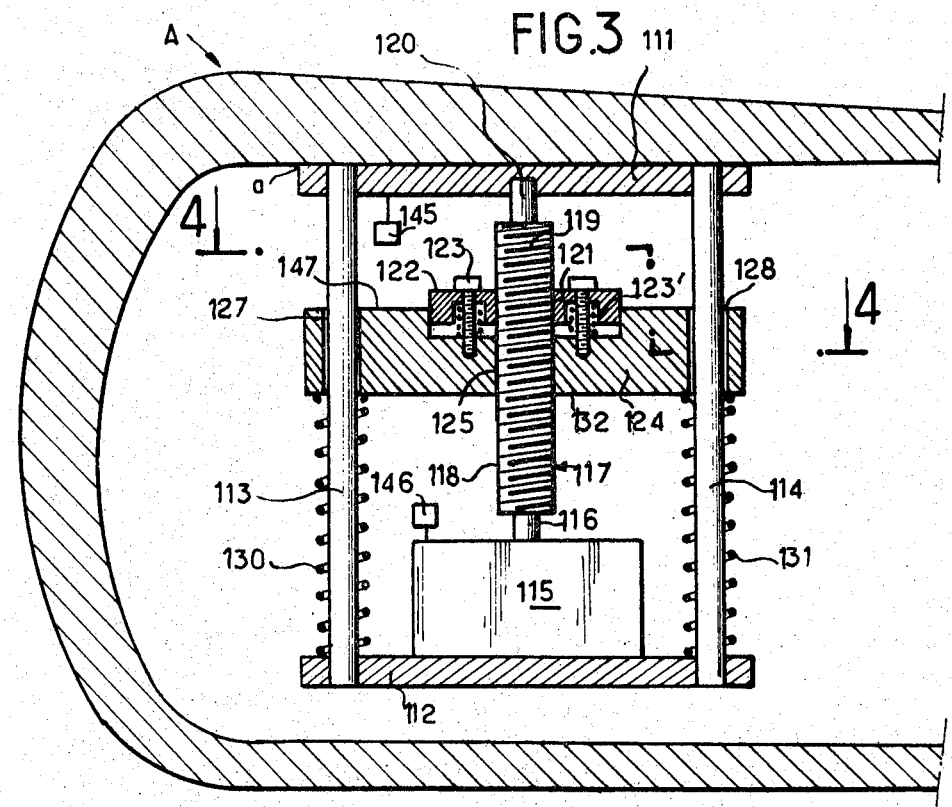
FIG. 3 is a diagrammatic cross-section of a generator according to the invention built into the wing of an aircraft, in a second embodiment.

With reference now to FIG. 3, the structure to be vibrated is the wing A of an aircraft in flight and it is desired to find the deformation characteristics of the wing, both from a spatial and a time point of view, when it is subjected to vibrations applied vertically to a zone $a$ of the wing, the wing being simultaneously subjected to considerable disturbing stresses such as those set up by atmospheric turbulence.

Figure 4:
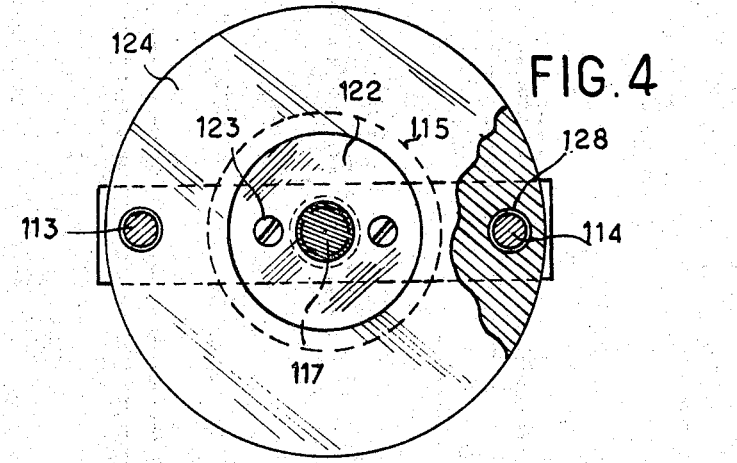
FIG. 4 is a cross-section along line 4—4 of FIG. 3.

The vibration generator according to the invention is attached to the wing A to be studied in the desired zone $a$. The generator comprises two parallel bases 111 and 112 (FIGS. 3 and 4) between which are placed two columns 113 and 114. To a base 112 is attached the housing of an electric motor 115 with two rotation directions and low inertia, a so-called servomotor, the shaft of which drives an end portion 116 forming part of a hollow cylindrical rod 117 having a relatively very small moment of inertia and the outer surface 118 of which is provided with a thread 119. The other end of the rod or hollow screw 117 is constituted by an end of shaft 120 rotatably mounted in base 111. The inner thread 121 of a ring nut 122 and the thread 125 of a solid anular disk 124 engage with thread 119. The ring nut 122 attached by screws 123 compressing spring 123′ constitute a device for regulating the relative play between thread 119 of screw 117 and thread 125 of disk 124.

Disk 124 possesses through-holes 127 and 128 in two diametrically opposed zones for guiding when it slides along columns 113 and 114. Spiral springs 130 and 131 surround the lower portions of columns 113 and 114 and support the lower face 132 of the heavy disk 124.

The length and force of springs 130 and 131 are such that, when bearing with its own weight against said springs, disk 124 is equidistant from the ends of screw 117.

Motor 115 is supplied by sinusoidal current and rotates first in one direction, then in the other, driving screws 117 in a periodic movement. By the cooperation of thread 119 of the screw with thread 125 of the disk 124, used as a nut, said disk is thus driven in one direction and then in the other, upwards and downwards, guided by columns 113 and 114. The reciprocating motion of the heavy mass constituted by disk 124 sets up vibration by inertia in the structure, namely the wing A in which the generator is fitted, and at a frequency that may be regulated or adjusted by selecting the frequency of the supply current for electric motor 115.

The device comprises safety switches 145 andd 146 which cut off the supply to the motor when they are engaged by the opposite faces, 147 and 132 respectively, of the desk.

The use of a servomotor and the relatively low moment of inertia of screw 117 enable sinusoidal driving of the motor under nominal conditions to be obtained, as desired.

The weight of disc 124 bearing on springs 130 and 131 is compensated and ensures that the mobile unit comprising the motor rotor, the screw 117 and the disk 124 maintain the same mean position throughout operation.

When the apparatus is not intended to operate vertically, the same mean position is maintained by adding springs bearing against base 111 and face 147 of disk 124 to each of the columns.

If, as a result of outside stresses undergone by the structure, for example those resulting from turbulence set up by the action on the wing of the relatively rapidly moving fluid by which it is surrounded, outside stresses are exerted on the vibration generator, these are not transmitted to the mobile unit of the generator, so that vibration generation using the inertia effect caused by the reciprocating movement of the heavy mass constituted by disk 124 remains unaltered.

Figure 5:
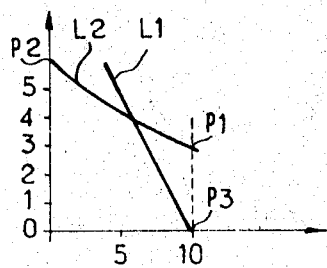
FIG. 5 is a graph.

In the graph of FIG. 5, line L1 represents the value of the torque transmitted by a screw-nut system made of materials having various friction coefficients, the values of which in terms of friction angle are represented on the abscissa on the basis of a constant outside force. The graph shows that irreversibility or lack of backlash is reached with a friction angle of 10°.

The same figure features another curve, L2, representing the values of stress applied to the structure through a constant torque exerted by the electric motor on the screw of the generator, this being a function of the friction angle.

It can be seen from the diagram that by selecting, in the case of the example described, the materials having a friction angle of 10°, the transmission of stresses to the structure by the electric motor operation is still acceptable, the value of the stress transmitted being represented by the point $p1$ the ordinate of which is, admittedly, lower than that of point $p2$, which corresponds to zero friction, while no outside stress is transmitted, as represented by point $p3$, of null ordinate.

On the graph, the values correspond to a hellicoidal thread with a rectangular cross-section, the helix angle being 10°.

The materials substantially cooperate with "dry" friction according to Coulomb's law. The values of torque L1 have been expressed in Newtons per meter. The values of force L2 are expressed in Newtons.

Figure 6:
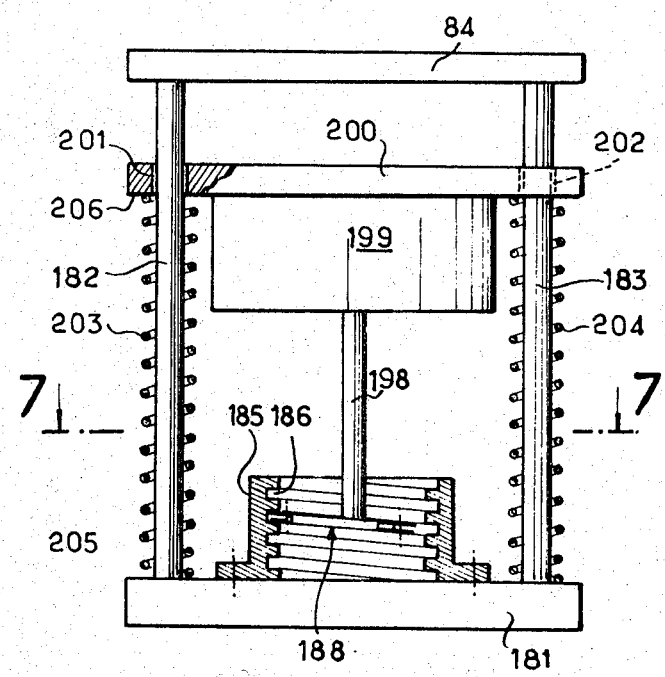
FIG. 6 is an elevation, certain portions being cut away, of a third embodiment.
Figure 7:
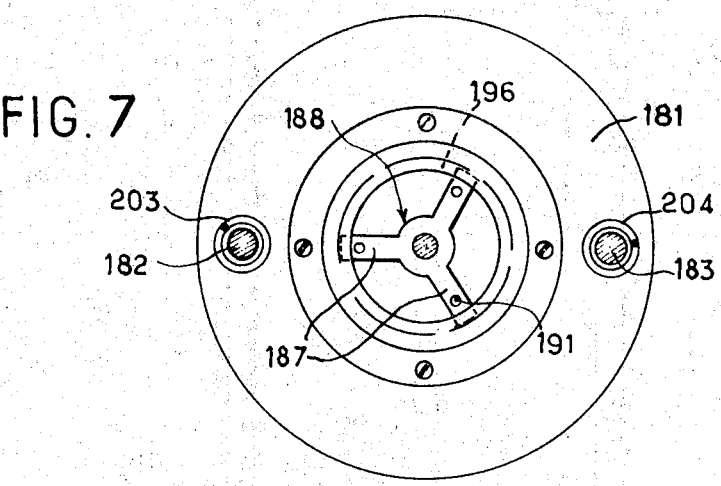
FIG. 7 is a cross-section along line 7—7 of FIG. 6.
Figure 8:
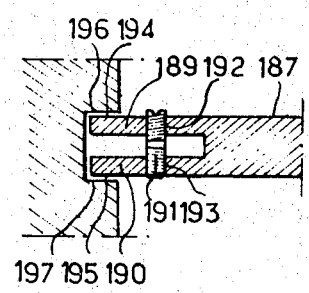
FIG. 8 is a larger scale partial cross-section.

With reference now to FIGS. 6 to 8, in this form of embodiment, the device comprises a base 181 on which are mounted two columns 182 and 183, their upper portions being interconnected by a bar 184. A sleeve 185, the inner surface of which is threaded at 186, is attached to base 181. The thread may have a rectangular or triangular cross-section. In the mode of execution represented in FIG. 6, it has a rectangular cross-section. The ends of three arms 187 of a star member 188 are engaged in thread 186. Each end 187 is forked to form two fingers 189 and 190 the spacing of which may be adjusted by means of a screw 191 the reversed threads of which engage with threads 192 and 193 provided on fingers 189 and 190. An arm 187 cooperates through their outer faces 194 and 195 with opposite faces 196 and 197 of thread 186.

Star member 188 is borne by the output shaft 198 of an electric motor 199 housed between columns 182 and 183; the housing of the motor is integral, opposite shaft 198, with an entablature 200 possessing throughholes 201 and 202 in two diametrically opposed zones to guide it in sliding along columns 182 and 183.

The latter are surrounded by spiral springs 203 and 204 which, on one hand, bear against the upper face 205 of base 181 and, on the other hand, against lower face 206 of entablature 200.

In this embodiment, the electric motor 199 forms part of the heavy mass whose reciprocal motions vibrate the structure to which the generator is attached through inertia.

With reference now to FIGS. 9 to 11, in this embodiment the shaft 220 of the electric motor 221 bears, keyed thereto, a plate 222 in the form of a star comprising three arms through each of which a rod 223 whose outer end forms a finger 224 slides without play. The upper and lower faces 229 and 230 of said fingers bear against opposite faces 231 and 232 of a thread 233 on the inner surface 234 of a shaft 235 owing to the action of an elastic radially expanding member 250 fitted around shaft 220 compressed by a nut 251 engaging in a thread 252 of the end of shaft 220.

The generator may be attached to the structure to be studied by means of holes 237 located on a base 236 of shaft 235.

Radial members 238 integral with the housing of motor 231 engage in a vertical groove 239 located on the inner surface of shaft 235 above thread 233.

Small brackets 240 attached to the upper portion of shaft 235 serve for attaching spiral springs 242 by their extremities 241, the other extremities 243 of the spring being attached to the housing of motor 221.

Operation in analogous to that of the preceding embodiments. The rotation of shaft 220 driving star member 222 causes the housing comprising motor 221, possibly ballasted, to move reciprocally in either directions according to the rotational direction of shaft 220 through the cooperation of fingers 224 of arms 223 of the star with thread 233 and causes the structure, for example wing A to which the generator is fixed, to vibrate through the effect of inertia.

Springs 242 compensate for the weight of the reciprocally moving mass and maintain the latter in a constant mean position.

Because of the irreversibility of the movement transmitting means constituted by thread 233 engaging with fingers 224 of arms 223, the stresses to which the structure is subjected, for example those resulting from turbulence, are not transmitted to the vibrating mass and thus do not modify its vibration rate.

Contacts may be provided to cut off supply to the motor should the amplitude of the vibrations exceed a predetermined value.

This embodiment is relatively low, thus enabling it to be housed inside a narrow aircraft wing.

What I claim is:

1. A vibration generator for attachment to a structure to be studied comprising: a frame element having means for attachment to said structure, a weighted mass mounted for rectilinear reciprocation upon said frame element, rotary motor means capable of rotation in either of two opposite rotational directions having a motion output shaft carried by said frame element, and means interconnecting said motion output shaft and said mass whereby rotational motion of said motor is converted to linear motion of said mass, and cyclic operation of said motor results in the impartation of a vibration to said frame.

2. A vibration generator in accordance with claim 1, wherein said last mentioned means is incapable of transmitting motion from said means to said motor means, whereby forces applied to said frame element are not transmitted to said mass to disturb the frequency of a generated vibration.

3. Structure in accordance with claim 2, wherein said last mentioned means includes a rack and pinion interconnection.

4. Structure in accordance with claim 2, in which said last mentioned means includes a nut and screw combination.

5. Structure in accordance with claim 2, wherein said last mentioned means includes a helicoidal spiral associated with said casing element, and means engaging said helicoidal spiral driven by said motor shafts.

6. Structure in accordance with claim 2, in which the rotating parts comprising the driving means have a relatively small moment of inertia.

7. Structure in accordance with claim 2, in which the rotating motor is of an electrical servomotor type.

8. Structure in accordance with claim 2, including a reciprocating mass moved in either of two opposite directions by rotational movement of said motor driving a shaft mounting a radially extending link engaging a helix on said casing element.

9. Structure in accordance with claim 8, in which said motor forms a part of the reciprocating mass.

10. A vibration generator adapted to impart a vibrating motion to a structure to be studied, particularly an aircraft wing, comprising means for fixing the generator to said structure, an inertia mass adapted to be moved with a reciprocating linear movement along a path extending substantially perpendicularly to said fixing means, guiding means of said mass depending from said fixing means, bi-directional rotative electrical motor means having an output power shaft, a current generator feeding said motor means, mechanical torque transmitting means on said shaft, and torque reception means cooperating with said torque transmitting means, whereby rotation of said power shaft is converted into a reciprocating movement of said mass which generates said vibration motion.

11. A vibration generator according to claim 10, wherein said motor means comprise two electrical motors the rotors of which are integral with said power shaft.

12. A vibration generator according to claim 11, wherein said motors are of the servomotor type.

13. A vibration generator according to claim 10, wherein said mechanical torque transmitting means comprise a toothed gear fixed on said shaft and wherein said torque reception means cooperating with said torque transmitting means is a rack attached to said fixing means and traversing said mass through openings thereof.

14. A vibration generator according to calim 10, further comprising spring means between said fixing means and said mass.

15. A vibration generator according to claim 10, wherein said mass is made of solid block and of said motor means.

16. A vibration generator according to claim 15, wherein said mass further comprises washers adapted to be removably secured on the end portions of said shaft.

17. A vibration generator according to claim 10, wherein said mechanical torque transmitting means is a threaded bar and wherein said torque reception means is a ring nut, means being further provided between said bar and said nut for controlling the mechanical play therebetween.

18. A vibration generator according to claim 10, wherein said mechanical torque transmitting means comprise a star shaped member fixed to said shaft and rods slidingly mounted within said member, finger members at one end of said rods, and an elastic radially expendible member fixed around said shaft and engaging the other end of said rods, said torque reception means comprising an innerly threaded sleeve attached to said fixing means, whereby cooperation of said fingers with said threaded sleeve converts rotation of said power shaft into a reciprocating motion of said mass which comprises said motor means.

19. A vibration generator according to claim 18, further comprising spring means between said mass and said sleeve, whereby the weight of said mass is compensated and the same is maintained in a constant mean position.

* * * * *